United States Patent [19]

Sampei et al.

[11] Patent Number: 4,962,636
[45] Date of Patent: Oct. 16, 1990

[54] MOWER

[75] Inventors: Keiichi Sampei; Yosihito Dei; Kazuo Furukawa; Katsumi Fukumoto; Yoshihiro Kato, all of Osaka, Japan

[73] Assignee: Kubota Ltd., Osaka, Japan

[21] Appl. No.: 330,800

[22] Filed: Mar. 30, 1989

[30] Foreign Application Priority Data

Mar. 31, 1988 [JP] Japan .................. 63-80373

[51] Int. Cl.⁵ ............................. A01D 34/54
[52] U.S. Cl. ........................... 56/17.1; 74/39; 74/521
[58] Field of Search ............ 56/12.4, 17.1, 17.2; 74/39, 521

[56] References Cited

U.S. PATENT DOCUMENTS

| | | | |
|---|---|---|---|
| 3,291,431 | 12/1966 | Daniel, Jr. | 74/521 X |
| 3,812,917 | 5/1974 | Strate | 56/17.1 X |
| 4,006,580 | 2/1977 | Kalleicher | 56/17.2 |
| 4,120,136 | 10/1978 | Rose | 56/17.1 |
| 4,252,228 | 2/1981 | White | 74/521 X |
| 4,577,455 | 3/1986 | Amano et al. | 56/17.1 |

FOREIGN PATENT DOCUMENTS 33-165230  3/1958  Japan .
34-192536  7/1959  Japan .

Primary Examiner—William P. Neuder

[57] ABSTRACT

A mower is provided which includes a pair of link mechanisms for mounting a cutter unit on the side of a mower body in suspended form. Each link mechanism includes a pair of lifting links. The paired lifting links are pivotably connected to the side of the mower body at opposing end portions. The other end portions of the paired lifting links are connected together so that the paired lifting links can be rotated upward and downward about the respective pivot points. The cutter unit is supported by respective intermediate portions of the lifting links in suspended form, and lifted by rotating the lifting links of the paired link mechanisms upward and downward in a linked relation.

23 Claims, 4 Drawing Sheets

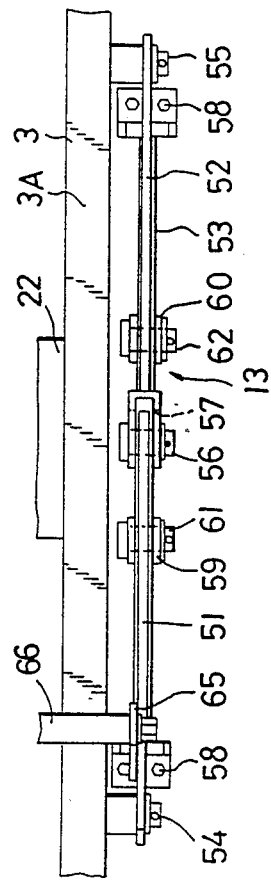
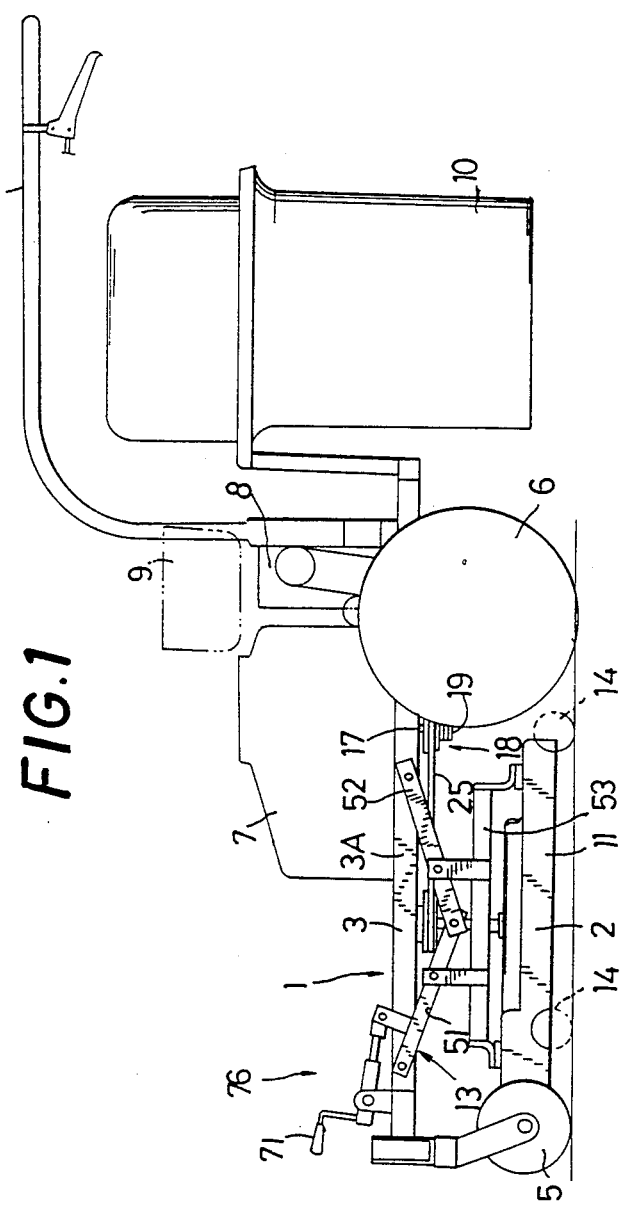

MOWER

BACKGROUND OF THE INVENTION

FIELD OF THE INVENTION

The present invention relates to a mower for cutting grass or the like which comprises a cutter unit mounted in a lower section of a mower body liftable in the horizontal position.

The lifting unit for lifting the cutter unit of the mower up and down with the cutter unit in the horizontal position includes, for example, the parallel link type disclosed in Japanese Utility Model Application Laid-Open No. 59-165230 and the pantagraph type disclosed in Japanese Utility Model Application Laid-Open No. 58-192536.

When lifting the cutter unit up and down, according to the parallel link type, the cutter unit is moved vertically while being shifted frontward and rearward with respect to the mower body. Thus, an additional space must be provided between front wheels and rear wheels to avoid contact with these wheels by the cutter unit. On the other hand, according to the pantagraph type, the cutter unit is moved vertically without any longitudinal relative shift, but it is difficult to retain the cutter unit in a lifted position for long distances.

OBJECTS AND SUMMARY OF THE INVENTION

The present invention has been accomplished to overcome the foregoing problems heretofore encountered.

Specifically, a first object of the present invention is to provide a mower equipped with a comparatively-compact lifting unit which can move a cutter unit vertically without any longitudinal relative shift over a long distance.

A second object of the present invention is to provide a mower which can fix a cutter unit at any desired position by the use of a lifting control means for controlling the lifting of the cutter unit.

A third object of the present invention is to provide a mower configured so that the tension of a belt for connecting in linked relation a driving pulley on the side of an engine and a driven pulley attached to an input shaft on the side of a cutter unit is unchanged irrespective of the lifted position of the cutter unit.

Other objects of the present invention will become apparent from the following description given with reference to the accompanying drawings.

To achieve the foregoing objects, the present invention provides the following provisions.

That is, a mower according to the present invention is configured so that a cutter unit is mounted on the side of a mower body by a pair of link mechanisms, each link mechanism including a pair of lifting links having one pair of ends pivotably connected to the side of the mower body with the other pair of ends being connected together so that the lifting links can be rotated upward and downward about their pivot points, the cutter unit being supported by respective intermediate portions of the individual lifting links in suspended form, and the upward and downward rotation of the lifting links being controlled by moving the lifting links of the paired link mechanisms in a linked relation by a lifting control means.

The upward and downward posture of each lifting link is fixed at a desired position by the lifting control means.

A driven pulley is supported on the side of the mower body rotatably about a vertical axis, the driven pulley has a vertical spline through-hole formed in its central portion, an input shaft on the side of the cutter unit is projected upward from the side of the cutter unit to define a spline shaft, and the spline shaft is spline-fitted in the spline hole of the driven pulley in a vertically shiftable manner.

BRIEF DESCRIPTION OF THE DRAWINGS

FIG. 1 is a side elevational view showing an embodiment of the present invention in its entirety;

FIG. 5 is a view taken in the direction of the arrows along line V—V of FIG. 3;

DETAILED DESCRIPTION OF THE PREFERRED EMBODIMENTS

Figure 2:
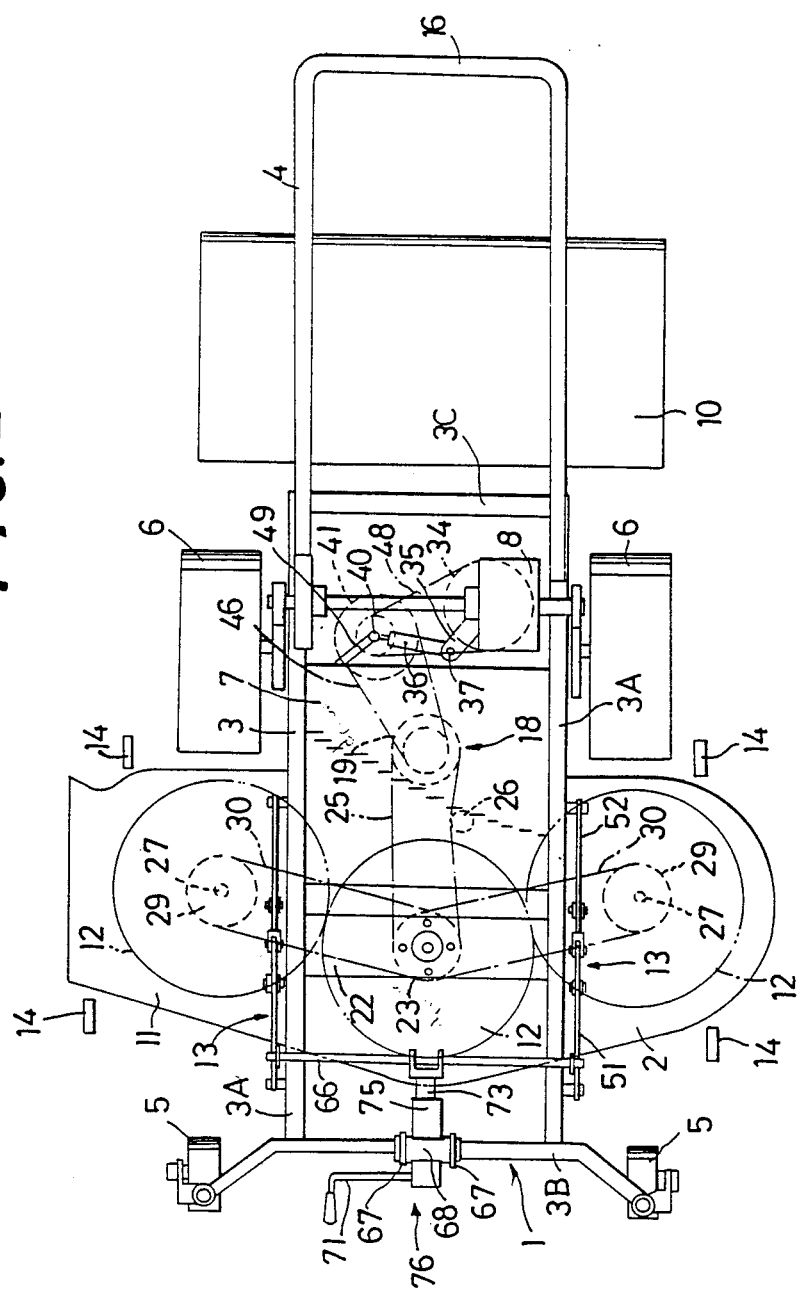
FIG. 2 is a plan view showing the same in its entirety.

The present invention will now be described in greater detail with reference to preferred embodiments shown in the drawings.

In FIGS. 1 and 2, reference numeral 1 designates an ambulatory type mower which includes a mower body 2, a body frame 3 making up a mower body, a cart control handle 4, a pair of left and right front wheels 5, a pair of left and right rear wheels 6, an engine 7, a rear wheel drive transmission casing 8, a fuel tank 9, and a grass catching container 10.

The mower body 2 comprises a deck 11 and three cutter blades 12 disposed below the deck 11 and rotated about vertical axes. The cutter unit 2 is supported by the body frame 3 by a pair of left and right link mechanisms 13 in a liftably suspended form, and is grounded via gauge wheels 14.

The body frame 3 is composed of a pair of left and right side frame members 3A, a front frame member 3B for the front wheels, and a rear frame member 3C, these frame members being assembled into a rectangular shape in plan view. The front frame member 3B is extended to the left and right, to each extended end portion of which a support rod for each front wheel 15 is rotatably attached about a vertical axis.

The handle 4 has a U shape in plan view, and projects upward from the rear end of the body frame 3 and then extends rearward. The thus extended rear end of the body frame defines a grip portion 16. Various control levers and the like for control of the mower 1 are provided in the vicinity of the handle 4.

Figure 4:
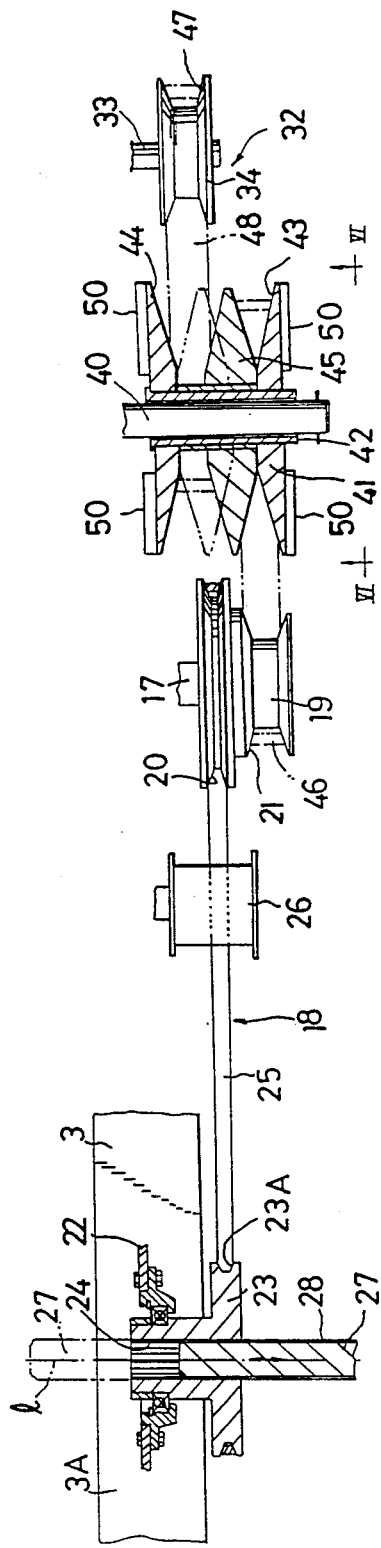
FIG. 4 is an explanatory diagram of a transmission unit.

The engine 7 is mounted on the side of a rear section of the body frame 3 and as shown in FIGS. 1 and 4, a driving shaft 17 projects downward from the under side of the engine. Motive power is transmitted from the driving shaft 17 to both the cutter blades 12 and the rear wheels 6 via a belt type transmission unit 18.

Figure 3:
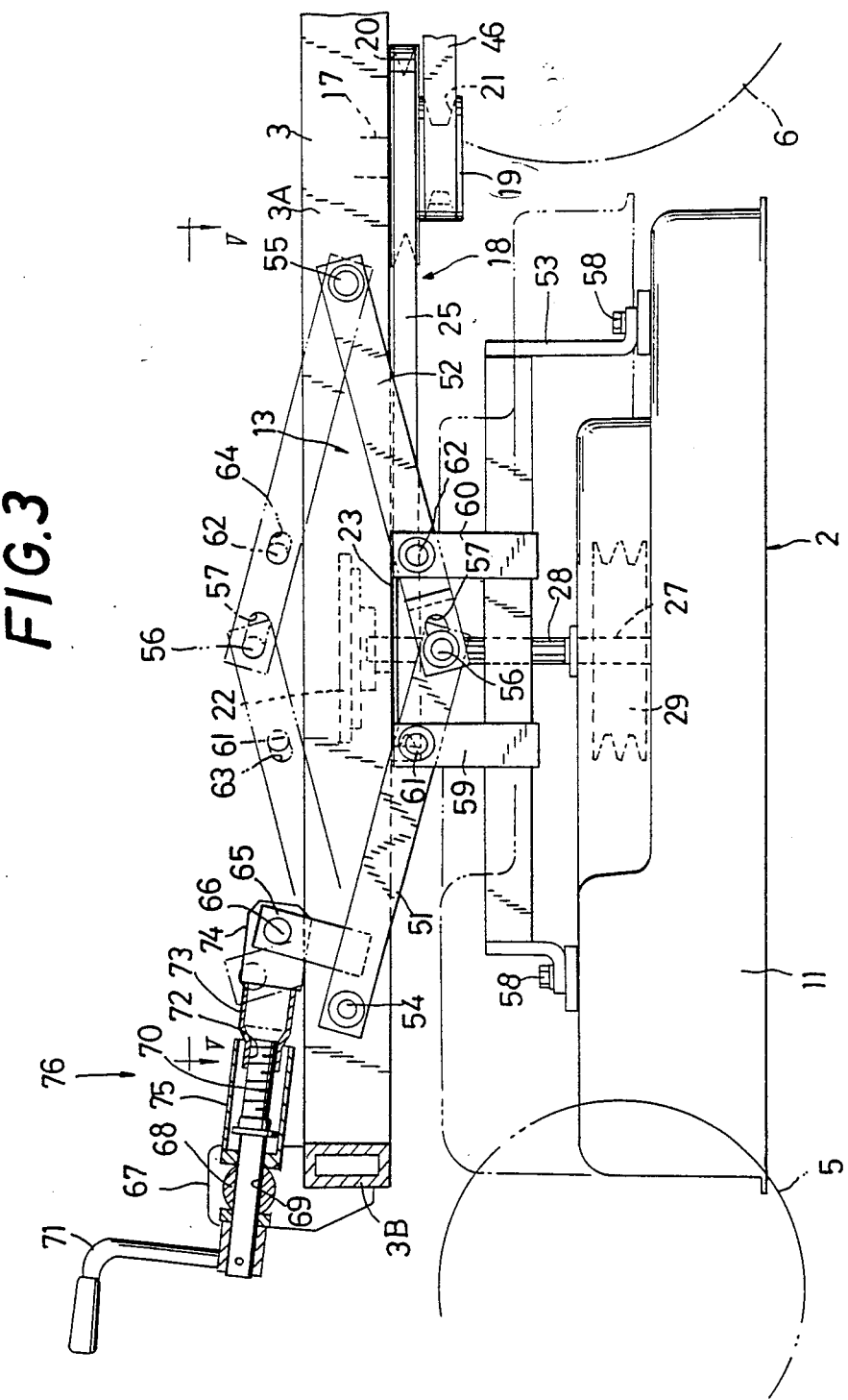
FIG. 3 is a side elevational view showing an important portion of the same.

As shown in FIGS. 3 and 4, the driving shaft 17 has a driving pulley 19 attached thereon rotatable together with the driving shaft 17, and the outer periphery of the drive shaft 17 has a pair of upper and lower belt grooves 20 and 21 formed therein.

In a front section of the body frame 3, a pulley supporting plate 22 is laid between the left and right side frame members 3A, whose laterally central portion rotatably supports a driven pulley 23 about a vertical axis 1. The driven pulley 23 has a vertical spline through-hole 24 formed in its central portion. A cutter blade driving belt 25 is stretched between the upper belt groove 20 of the driving pulley 19 and a belt groove 23A of the driven pulley 23. Element 26 is a tension roller which is adapted to removably apply pressure to the belt 25.

A rotary shaft 27 of the central cutter blade with respect to the three cutter blades 12 is projected upward from the deck 11, and has a projected portion which defines a spline shaft 28 adapted to be spline-fitted in the spline hole 24 of the driven pulley 23. Thus, the spline shaft 28 forms an input shaft on the side of the mower body 2. In addition, each rotary shaft 27 has a cutter blade power transmission pulley 29 attached thereon, and cutter blade power transmission belts 30 are stretched between these pulleys 29. With the foregoing structure, each cutter blade 12 is rotated by the engine 7.

The rear wheel drive transmission casing 8 is attached in a rear end portion of the body frame 3 which is located in the rear of the engine 7, a driven shaft 33 is projected downward from the under side of the unit 8, and a driven pulley 34 is rotatably attached to the shaft 33. The transmission casing 8 has an overhang arm 35 attached to its under side, and a swinging arm 36 swingably attached to the overhang end of the overhang arm 35 about a vertical support shaft 37. The swinging arm 36 has a relay shaft 40 attached to and projecting downward from its distal end, this relay shaft 40 being configured so that when spaced away from one of the driving shaft 17 and the driven shaft 33 in response to the swinging of the swinging arm 35, the relay shaft 40 approaches the other shaft. The relay shaft 40 has a relay pulley 41 attached thereon.

The relay pulley 41 is made relatively rotatable with respect to the relay shaft 40 via a sleeve 42, and has a first, lower belt groove 43 and a second, upper belt groove 44. Both belt grooves 43 and 44 are designed so that the groove width in the axial direction becomes progressively narrow as approaching the pulley center. A partition element 45 disposed between the belt grooves 43 and 44 is made movable in the axial direction. A first belt 46 is stretched between the lower belt groove 21 of the driving pulley 19 on the driving shaft 17 and the first belt groove 43, and a second belt 48 is stretched between the belt groove 47 of the driven pulley 34 and the second belt groove 44. With the foregoing structure, the rotation of the driving shaft 17 is transmitted to the driven shaft 33.

A control bracket 49 extends from the upper end of the relay shaft 40, so that by controlling this control bracket 49, the relay shaft 40 is caused to approach and be spaced apart from the driving shaft 17. When the relay shaft 40 is spaced apart from the driving shaft 17 to approach the driven shaft 33, the tension of the first belt 46 stretched between the driving pulley 19 and the relay pulley 41 increases, whereas the tension of the second belt 48 stretched between the relay pulley 41 and the driven pulley 34 decreases. As a result, a component of force acting to move the partition element 45 in the axial direction toward the second belt groove 44 is produced because the groove width in the axial direction of each of the belt grooves 43 and 44 of the relay pulley 41 is designed to become progressively narrow as approaching the pulley center. With this component of force, the partition element 45 moves in the axial direction toward the second belt groove 44, so that the diameter of the pitch circle of the first belt groove 43 becomes small, whereas the diameter of the pitch circle of the second belt groove 44 becomes large, whereby the driven shaft 33 is accelerated.

On the contrary, when the relay shaft 40 is caused to approach the driving shaft 17, the driven shaft 33 is reversely decelerated.

The rotation of the driven shaft 33 thus accelerated or decelerated is transmitted to the rear wheels 6 via a transmission unit provided in the transmission casing 8 and the like, so that the running speed is increased or decreased, respectively. Here, the driven shaft 33, driven pulley 34, relay shaft 40, relay pulley 41, first belt 46, second belt 48, transmission unit, and the like make up a rear wheel drive mechanism 32 for driving the rear wheels 6.

Figure 6:
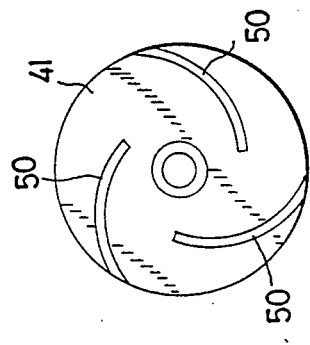
FIG. 6 is a view taken in the direction of the arrows along line VI—VI of FIG. 4.

As shown in FIGS. 4 and 6, a plurality of blowing-/cooling vanes 50 are attached on the upper and lower sides of the relay pulley 41, so that a cooling function is exerted while the relay pulley 41 is rotating.

As shown in FIGS. 3 and 5, each link mechanism 13 includes a pair of front and rear lifting links 51 and 52 of substantially identical length, these lifting links 51 and 52 and the deck 11 being connected together by a connecting bracket 53. The lifting links 51 and 52 are disposed outside of the side margins of the body frame 3 and longitudinally spaced from each other, the respective paired end portions of these lifting links being pivotably connected to support shafts 54 and 55, and the respective other end portions being connected together by a pivot pin 56. To make the lifting links 51 and 52 rotatable upward and downward about the respective support shafts 54 and 55, an elongate hole 57 is bored in the other end portion of one lifting link so that the pivot pin 56 can shift with respect thereto. Further, as illustrated by the imaginary lines in FIG. 3, the respective other pair of end portions on the side of the pivot pin 56 are rotatable upward beyond the level of the support shafts 54 and 55.

The connecting bracket 53 is disposed so that its lengthwise direction will accord with the longitudinal direction of the mower body is secured to the upper side of the deck 11 by bolts 58, and has forked connecting elements 59 and 60 extending upward so that they can be grippingly connected with the lifting links 51 and 52 from below. That is, the connecting elements 59 and 60 are connected at their upper end portions to respective intermediate portions of the lifting links 51 and 52 via pivot pins 61 and 62. To permit the upward and downward rotation of the lifting links 51 and 52, pin receiving holes 63 and 64 formed in the lifting links 51 and 52 are made elongate so that the pivot pins 61 and 62 can shift with respect thereto. With the foregoing structure, the mower body 2 is supported by the lifting links 51 and 52 in suspended form.

The lifting link 51 on the front side of each of the left and right link mechanisms 13 has a connecting arm 65 extending upward, and the left and right connecting arms 65 are connected together by a connecting rod 66.

A pair of left and right attaching plates 67 are provided on the upper side of the front frame member 3B of the body frame 3, with each plate at a central portion of a left or right half. A support rod 68 is rotatably supported by the attaching plates 67 about a lateral or transversal axis, a control screw shaft 70 is attached to the support rod 68, via a through hole 69 bored therein, relatively rotatably about its axis, and a control handle 71 for rotation control is fixedly attached to a front end portion of the control screw shaft 70 in frontward projecting position. A rear end portion of the control screw shaft 70 supports an internal-thread cylinder 73 having an internal thread portion 72 which is retractably engaged with the rear end portion of the shaft 70. A rear end portion of the internal-thread cylinder 73 supports a connecting element 74 of U shape in plan view through which the connecting rod 66 passes relatively rotatably. To protect an external thread portion of the control screw shaft 70, a protection cylinder 75 is disposed so as to cover the external thread portion.

In the position illustrated in FIG. 3, when the control handle 71 is turned clockwise, for example, the internal thread portion 72 of the internal-thread cylinder 73 is progressively engaged with the external thread portion of the control screw shaft 70, so that the internal-thread cylinder 73 is pulled toward the control screw shaft 70, the lifting links 51 on the front side of the link mechanisms 13 are rotated upward about the support shafts 54 via the connecting arms 65 and the connecting rod 66, and in linked relation, the lifting links 52 on the rear side are also rotated upward about the support shafts 55. In this operation, since the lifting links 51 and 52 and the mower body 2 are connected together by the connecting brackets 53, the mower body 2 is moved up without any relative longitudinal shift as illustrated by the imaginary lines. Further, the spline shaft 28 which is the upper portion of the cutter blade rotary shaft 27 of the mower body 2 is moved up along the spline hole 24 of the driven pulley 23. On the contrary, when the control handle 71 is turned counterclockwise, the mower body 2 is moved down through an operation reverse to the foregoing. In the process of moving the mower body 2 up and down, if the turning control of the control handle 72 is stopped when the mower body 2 reaches a desired height, the distance between the support rod 18 on the side of the front frame member 3B and the connecting rod 66 on the side of the lifting links 51 is kept constant, so that the upward and downward posture of each of the lifting links 51 and 52 is fixed, whereby the mower body 2 is held at a certain height. Hence, the control handle 71, control screw shaft 70, internal-thread cylinder 73, support rod 68, connecting arms 65, connecting rod 66, and the like make up a lifting control means 76 for lifting the horizontal mower body 2.

Since the preferred embodiment of the present invention is composed as described above, the mower body 2 can be moved up and down substantially vertically without any relative longitudinal shift, so that the cutter unit has no fear of interfering with the front wheels 5 and the rear wheels 6. Thus, the mower body 2 can be assembled in a larger size. Other advantages are that since the lifting links 51 and 52 are configured to rotate upward and downward over a wide range, a large liftable distance can be secured for the mower body 2, thereby resulting when no hindrance in running on the road and allowing an easy adjustment of cutting height in cutting grass. Compared with the pantagraph type, the mower of the present invention can be compactly composed. Since the mower body 2 is moved up and down using the screw system, the lifting control is readily attained steplessly.

Further, since the driven pulley 23 is rotatably supported by the pulley supporting plate 22 on the side of the body frame 3 and the spline shaft 28 on the side of the mower body 2 is spline-fitted in the driven pulley 23 to be vertically shiftable, tension of the belt 25 is maintained constant irrespective of the lifted position of the mower body 2, so that unexpected slippage or removal of the belt 25 is prevented and power transmission is reliably attained.

Further, since the mower body 2 can be fixed at a desired height position by the lifting control means 76, there is no need to provide additional height fixing means, thereby simplifying the overall structure.

Further, since the mower body 2 is supported in the front section of the body frame 3 in a suspended form, and the engine 7, transmission casing 8, and the like are mounted in the rear section, the overall balance of the mower 1 can be enhanced.

Figure 7:
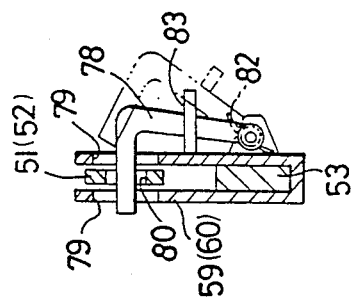
FIG. 7 is a sectional view showing another linking structure between a lifting link and a bracket on the side of a cutter unit.

Although the foregoing structure shows the connecting elements 59 and 60 and the lifting links 51 and 52 being connected together via the pivot pins 61 and 62, if, as shown in FIG. 7, substantially L-shaped hook pins 78 are pivoted to side portions of the connecting elements 59 and 60 and urging springs 82 are provided which urge the hook pins 78 to pass through both through holes 79 and 80, the detaching of the mower body 2 becomes easy, while preventing the pins 78 from coming off and being lost. Incidentally, 83 is a stopper fixed to the hook pin 78.

Further, although the foregoing structure shows the pair of link mechanisms 13 being disposed side by side, the link mechanisms may be arranged in a longitudinal direction.

The grass catching container 10 is adapted to catch and store grass therein cut by the mower body 2, which is mounted in the rear of the body frame 3 and disposed below the handle 4. A discharge port on the side of the mower body 2 is connected with an inlet port of the grass catching container 10 by a duct not shown, so that cut grass is collected through the duct.

What is claimed is:

1. A mower comprising:
a cutter unit liftably mounted in a horizontal position on a side of a mower body via a pair of link mechanisms;
each of said link mechanisms including a pair of lifting links, a first end portion of said pair of lifting links being connected together so that said lifting links are rotatable upward and downward about their respective pivot points, said cutter unit being supported by respective intermediate portions of said lifting links in suspended form;
lifting control means for moving said pair of lifting links for each of said pair of link mechanisms to cause the upward and downward rotation of said lifting links;
front wheels in the forward end of said mower body and rear wheels in the rearward end of said mower body, said cutter unit being liftably mounted between said front and rear wheels; and
a driving pulley provided on a driving shaft of an engine mounted on said mower body and a driven pulley provided on an input shaft at the side of said cutter unit, said drive shaft and said driven shaft being rotatably connected by a belt member, thereby rotating cutting blades of said cutter unit;

wherein said driven pulley is rotatably supported about a vertical axis on the side of said mower body, said driven pulley including a vertical spline through-hole formed in a central portion thereof, said input shaft projecting upward from the side of said cutter unit to define a spline shaft, and wherein said spline shaft is vertically spline-fitted to shift in said spline through-hole.

2. A mower according to claim 1, wherein said link mechanisms are individually disposed outboard of said mower body, opposing ends of said paired lifting links of each of said link mechanisms being longitudinally spaced from each other and pivotably connected to the side of said mower body, a shaft receiving hole of one of said paired lifting links being made elongate so that opposing end portions of said paired lifting links connected together by a pivot shaft can be moved up and down beyond the level of said pivot points on the side of said mower body, and said lifting control means is provided in a front section of said mower body so that it can be controlled from the front side of said mower body.

3. A mower according to claim 2, wherein said mower body is composed of a pair of left and right side frame members extending longitudinally and a front frame member for connecting front end portions of said side frame members together, said lifting links of each of said link mechanisms being pivotably connected to outside portions of a corresponding one of said side frame members, said lifting control means being mounted on said front frame member, and further including a connecting rod for connecting said lifting links on the front side of said link mechanisms together, said connecting rod being linked to said lifting control means.

4. A mower according to claim 3, wherein a pulley supporting plate is laid between said left and right side frame members, and said driven pulley is rotatably supported by said pulley supporting plate.

5. A mower according to claim 4, wherein said lifting control means is made expandable and retractable by means of a screw mechanism, said lifting links being rotatable upward and downward and fixable at desired positions by regulating the distance between a connected portion of said lifting control means with said front frame member and another connected portion of said lifting control means with said connecting rod, and a control handle for controlling said screw mechanism to cause expansion and retraction is provided projectingly frontward from said front frame member.

6. A mower according to claim 5, wherein a protection cylinder is provided so as to cover the outer periphery of said screw mechanism.

7. A mower comprising:
a cutter unit liftably mounted in a horizontal position on a side of a mower body via a pair of link mechanisms, each of said link mechanisms including a pair of lifting links, a first portion of said pair of lifting links being pivotably connected to the side of said mower body, and a second end portion of said pair of lifting links being connected together so that said lifting links are rotatable upward and downward about their respective pivot points, said cutter unit being supported by respective intermediate portions of said lifting links in a suspended form;
lifting control means for moving said pair of lifting links for each of said pair link mechanisms to cause the upward and downward rotation of said lifting links;
connecting elements extending upward from the side of said cutter unit, said connecting elements being pivotably connected to respective intermediate portions of said lifting links so that said cutter unit is supported in suspension; and
pivot pins for pivotably connecting said connecting elements on the side of said cutter unit, wherein said lifting links together are in the form of substantially L-shaped hook pins, one end portion of each of said hook pins being rotatably pivoted to a side portion of the corresponding one of said connecting elements, with the other end portion of each of said hook pins pivotably connecting the corresponding one of said connecting elements and the corresponding one of said lifting links together, and each of said hook pins has an urging spring for urging the other end portion of the hook pin so as to cause a pivotable connection.

8. A mower according to claim 5, wherein said paired lifting links are substantially identical in length.

9. A mower according to claim 8, wherein said cutter unit is supported on the side of the forward section of said mower body in suspended form, said engine being mounted on the side of the rearward section of said mower body, and further including a rear wheel drive mechanism provided in a rear end portion of said mower body, whereby the cutter blades of said cutter unit and said rear wheels are driven by said engine.

10. A mower according to claim 9, wherein a handle for control of the mower is provided projectingly rearward from said rear section of said mower body.

11. A mower according to claim 10, wherein a grass catching container for collecting grass cut by said cutter unit is mounted at the rear of said mower body and below said handle member.

12. A mower vehicle comprising:
a mowing member horizontally mounted between front and rear wheels;
a pair of link mechanisms secured outboard of a vehicle at two opposite sides of the mower vehicle for horizontally lifting said mowing member;
each said link mechanism including
a pair of lifting arms, the paired arms each having opposing ends thereof pivotally mounted on a pair of outboard shafts which are secured to and spaced apart from the vehicle in a longitudinal direction thereof, and adjacent ends thereof crossed with respect to each other to form a pivotal connection therebetween, and an elongated opening being provided on one of said pair of arms at the pivotal connection;
the mowing member being cooperatively suspended by a pair of connecting elements vertically secured at intermediate points of respective lifting arms and extending upward from the side of said cutter unit;
wherein the pivotal connection is adapted to move upward and downward by producing a pivotal motion with one of the vertical link members with respect to one of the corresponding outboard shafts; and
lifting control means for pivotally moving one of the arms with respect to a corresponding outboard shaft to cause linked actions of the other arm and to thereby permit the pivotal connection, with said elongate opening, to move up and down across a height level defined by the two outboard shafts.

13. A mower vehicle according to claim 12, wherein said lifting control means is operative on one of two opposing longitudinal sides of said mower vehicle body.

14. A mower vehicle according to claim 13, wherein said mower vehicle further includes
an engine mounted on said mower vehicle,
a drive pulley driven by said engine,
a driven pulley mounted on said mower body via a drive shaft,
a belt member connecting said drive pulley and said driven pulley,
cutting members provided on said mower body, wherein said cutting members are rotated in response to said drive pulley driving said driven pulley via said belt member,
said driven pulley being vertically rotatable and including a splined hole formed at the center thereof, said drive shaft being formed as a splined shaft vertically mounted on said mower vehicle body, wherein said drive shaft is engaged with said driven pulley with vertical mobility.

15. A mower vehicle according to claim 24, wherein said lifting control means is provided at a forward end of the mower vehicle body and is operated by a control handle from the forward end of the vehicle.

16. A mower vehicle according to claim 15, wherein said mower vehicle body includes a pair of longitudinal side frames and a front frame connecting the pair of side frames, said lifting link members of said pair of link mechanisms being pivotably mounted outboard of said side frames and said lifting control means being mounted on said front frame and operatively connected to a rod member connecting two front links of said pair of link mechanism.

17. A mower vehicle according to claim 16, wherein a pulley support plate is provided as a bridge between said side frames, and wherein the driven pulley is mounted in a freely rotatable manner on said pulley support plate.

18. A mower vehicle according to claim 17, wherein said lifting control means includes a screw mechanism to lead and lag, said screw mechanism being rotatably adjustable to a length between a connecting point of said lifting control means to the front frame and a connecting point of the connecting rod, whereby lifting and holding at any height is attainable, and further including a handle for operating the screw mechanism, said screw mechanism being provided to generally project from the front frame.

19. A mower vehicle according to claim 12, wherein said mower vehicle body is suspended by a pair of vertical connecting elements mounted thereon with pivotal connections at intermediate points of said lifting link members, wherein a generally L-shaped hook pin is fitted into mounts on said connecting elements and to said pair of lifting link members, wherein the hook pin is pivotable at one end to the connecting element and pivotably connected at the opposing end to be engageable with corresponding ones of said lifting link members, wherein a spring pivotably urges said L-shaped hook pin into engagement with said lifting link members.

20. A mower vehicle according to claim 18, wherein each of said pair of lifting link members is approximately equal in length.

21. A mower vehicle according to claim 20, wherein said mower vehicle body is suspended at a forward end of said mower vehicle, and an engine is mounted at a rearward portion thereof, and a transmission for said rear wheels is mounted at a rear end of said vehicle, wherein the engine is disposed to drive both said cutting members and said rear wheels.

22. A mower vehicle according to claim 21, wherein a handle for operating the mower vehicle is mounted at the rearward end of said vehicle and projecting therefrom thereby providing a walk-behind or push-type mower vehicle.

23. A mower vehicle according to claim 22, wherein a bin is provided at the rearward end of the mower vehicle under said operation handle for collecting clippings cut by said mower.

* * * * *